Jan. 18, 1949. S. E. ROBBINS ET AL 2,459,287
RELEASABLE WEIGHT
Filed Dec. 18, 1944
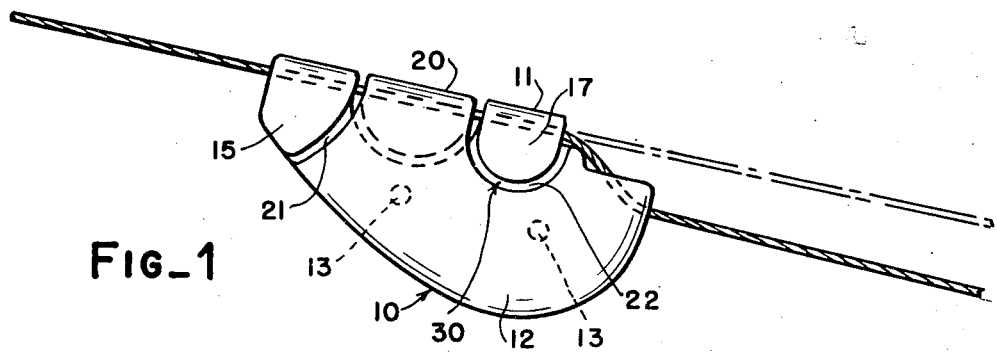
FIG_1
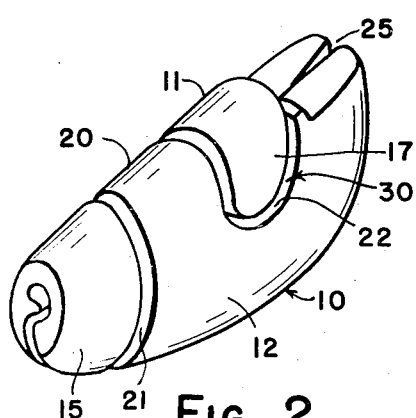
FIG_2
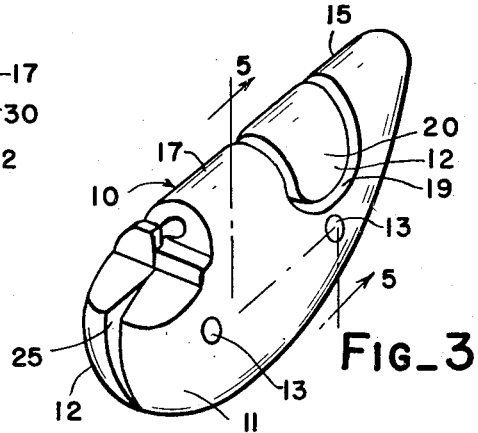
FIG_3
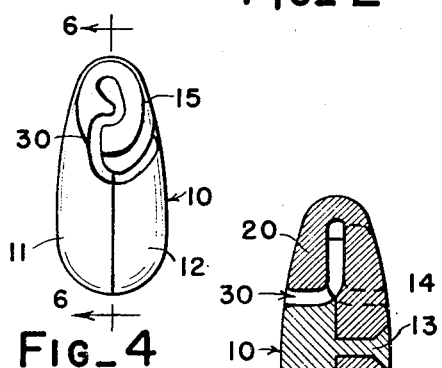
FIG_4
FIG_5
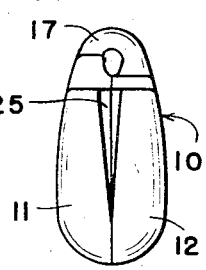
FIG_6
FIG_7
SAM E. ROBBINS
FRANK L. LARSON Inventors
By Smith & Tuck
Attorneys Patented Jan. 18, 1949

2,459,287

UNITED STATES PATENT OFFICE 2,459,287

RELEASABLE WEIGHT

Sam E. Robbins and Frank L. Larson,
Seattle, Wash.

Application December 18, 1944, Serial No. 568,668

4 Claims. (Cl. 43—52)

Our invention relates to the improvements in a releasable weight and, more particularly, to a weight for use by fishermen in a trolling operation with the fishing line, which weight will be disengaged from its normal trolling position when the lure is struck and hooks a fish.

While there are many uses of our invention, which will be apparent to those skilled in the art, we prefer to describe its use by fishermen as being one that most fully discloses the merits and operability of the invention. Salmon fishermen in the Pacific Coast area, particularly to Puget Sound, prefer to fish "deep," which includes trolling a lure slightly above the bottom, as there it has been found that the largest fish are most likely to be encountered and caught. In such fishing, it is customary to troll a line from a boat, depressed by attaching a weight, say 10 to 30 ft. forward of the rear end of the line, to which the lure is attached. A weight of a size sufficient to depress the line at the determined trolling speed, is employed, and is either securely or releasably attached to the line, as above described. The lure, which is normally buoyant, will trail upward and rearward of the weight at a height determined by the speed of the trolling, by the buoyancy of the lure, and by the length of the line to the rear of the lure. With such a rig, when a fish is caught on the lure, difficulty is encountered as the line is reeled in, because the weight arrives at the tip of the rod while there is still a portion of free line between the weight and the lure. This makes the landing of the fish difficult, and it has become customary to employ what is known as releasable weights. Several different mechanisms are known in the art, but most of them are subject to the criticism that they will release upon the occurrence of a sudden but slight jerk on the main part of the line. Often such weights will fail to release when there is a jerk on that portion of the line trailing the weight, as when a fish is caught. Other objections relate to complexity of manufacture, due to the necessity of casting inserts in the weight; to lack of external smoothness which results in the fouling of the weight when sea-weed is encountered and clings to external protuberances; and to difficulty in attaching the prior art weights to the line.

Having in mind the defects of the prior art, it is an object of our invention to design a releasable weight for fishermen that is unreleasable by a jerk or pull from the forward direction.

Another object of our invention is to provide in a weight of the type described, a releasable element, which will readily free the weight by a reasonable pull on that portion of the line trailing the weight in a fishing operation.

A still further and more specific object of our invention is the provision, in a weight of the type described, of rapidly operable line-receiving means for the attachment of a weight to a line which creates no hindrance and does not require great skill to attach.

The foregoing objects and others ancillary thereto we prefer to accomplish as follows:

According to a preferred embodiment of our invention, we provide within a fishing weight a line-receding passage, and line-gripping means adjacent the rear terminal of said passage. Specifically, the weight is provided with ancillary passages communicable with the line-receiving passage from each side thereof for the threading of the line into the principal passage. Normally, the weight is constructed in two parts with interfitting portions and includes means for attaching the two portions together into a rigid and solid structure with a jaw provided between the two portions at the trailing end of the weight, and a principal passage in the two portions forwardly thereof to receive a line passing through the weight. The novel features that we consider characteristic of our invention are set forth with particularity in the appended claims. The invention itself, however, both as to its organization and its method of operation, together with additional objects and advantages thereof, will best be understood from the description of a specific embodiment when read in connection with the accompanying drawings, in which:

Fig. 1 is a view in side elevation showing the weight attached to a fishing line;

Fig. 2 is a perspective view of the weight taken from a forward and oblique viewing point;

Fig. 3 is a perspective view of the weight taken from a rear and slightly oblique viewing point;

Fig. 4 is a view in elevation of the nose of the weight;

Fig. 5 is a sectional view of the weight taken on line 5—5 of Fig. 3;

Fig. 6 is a vertical sectional view taken on line 6—6 of Fig. 4; and

Fig. 7 is a view in elevation of the rear or trailing end of the weight.

A releasable weight to overcome the defects hereinbefore enumerated must have at least two totally distinct charactristics; it must be capable of easy attachment to a fishing line; and it must also be undislodgable from said line by a jerk being exerted from the line forward of the weight, but nevertheless releasable from said line by a jerk exerted to the rear of the weight. Accordingly, a preferred embodiment of our invention, referring to the figures of the drawing, is constituted by a heavy, metallic body adapted to pinch or grip a line and into which may be threaded a trolling line. The weight is designated as a whole by the numeral 10 and comprises segments 11 and 12 ordinarily formed by casting operations. The segments are adapted to be secured together by riveted pins 13, 13 or their equivalent.

The segment portion 11 has inverted hooks 15 and 17 with a cut-out portion 19 therebetween. The segment 12 likewise has the inverted hook 20, whose bill interfits in the notch 19 between hooks 15 and 17. Segment 12 is provided with suitable cut-out portions 21 and 22 for the reception of the bills of hooks 15 and 17, respectively, all as shown in the drawings.

In one mode of construction, we provide the weight segment 12 with rivets 13, 13, which pass through holes 14, 14 in segment 11. These rivets during assembly are peened into a countersink at the outer end of openings 14 for secure rigid joinder of the two parts. This arrangement does not disturb the outer contour of the weight which is normally of streamlined shape, somewhat after the manner of a tear-drop.

Line-receiving space is provided by alignment of the throats of the various hooks 15, 17 and 20. Each bill loosely interfits in a cut-away portion to provide, on either side of a straight line-receiving passage formed under the aligned hooks, tortuous passages 30, communicating with the main passage and through which bights of the line may be led to engage the weight on the line. For the purposes of gripping the line opposed faces of the trailing portion of the two segments or halves of the weight are slightly sloped, so that when the segments 11 and 12 are brought together, a V-shaped gripping notch 25 is formed into which, as shown in Fig. 1, the line may be depressed and gripped by the converging walls of the notch 25.

In operation, in fishing with the line attached as shown in Fig. 1, extreme jerks and pulls can be exerted against the standing part of the line proceeding forward from the weight without dislodging or releasing the weight from the line. This is so because the weight employed is normally heavier than any force which can be exerted upon the trailing end portion of the line by the lure itself. However, when a fish is hooked by the lure, normally the activity of the fish will overcome the frictional engagement of the trailing line in gripping jaw 25 and the same will be dislodged therefrom, permitting the weight to slide down the line until it is stopped adjacent the lure; or a fisherman, by jerking the standing part against the action and weight of the fish, dislodges the weight. Thus a fisherman is free to reel in his line up to the lure, and any fish that may be hooked on the lure may be landed without interference.

While we have shown and described a particular embodiment of our invention, it will occur to those skilled in the art that various changes and modifications may be made without departing from the invention, and we therefore aim in the appended claims to cover all such changes and modifications as fall within the true spirit and scope of our invention.

Having thus described our invention, we claim:

1. A releasable weight for fishing lines, comprising: a body member having a longitudinal passage therethrough for the threading therein of fishing line, and releasable clamp means adjacent an end of said passage and disposed wholly within the surfaces of said body for gripping a line threaded through said passage.

2. A releasable weight for fishing lines, comprising: a body member having a longitudinal passage therethrough for the threading therein of a fishing line, said body also having continuous tortuous passages having communication and intersection with said longitudinal passage at several points along its length, and releasable clamp means adjacent an end of said longitudinal passage and disposed wholly within the surfaces of said body for gripping a line threaded through said passage.

3. A releasable weight for fishing lines, comprising: a body portion having an inverted hook thereon, a second body portion having an inverted hook thereon, said body portions being adapted to be joined face to face and having the hooks arranged thereon so that when the two body portions are thus brought together they will be disposed in tandem but oppositely directed, means for securing said body portions in assembled relation, and releasable clamp means between said second body portion and said first body portion for gripping a line threaded through the throats of said tandem hooks.

4. A releasable weight for fishing lines, comprising: a body portion having an inverted hook thereon, a second body portion having an inverted hook thereon, said body portions being adapted to be joined face to face and having the hooks arranged thereon so that when said body portions are brought together they will be disposed in tandem but oppositely directed and the throats thereof will be aligned to form a passage, each said body portion having a cut away portion of a size for the loose reception of a hook on the opposite body portion whereby to form a passage around each hook bill communicable with said passage, means for securing said body portions together, and releasable clamp means between said second body portion and said first body portion for gripping a line threaded through the throat passage under said hooks.

SAM E. ROBBINS.
FRANK L. LARSON.

REFERENCES CITED

The following references are of record in the file of this patent:

UNITED STATES PATENTS

| Number | Name | Date |
|---|---|---|
| 1,549,881 | Johnson | Aug. 19, 1925 |
| 2,183,818 | Minser | Dec. 19, 1939 |

FOREIGN PATENTS

| Number | Country | Date |
|---|---|---|
| 4,592 | Great Britain | Feb. 2, 1895 |